United States Patent
Yahara et al.

(10) Patent No.: US 7,715,083 B2
(45) Date of Patent: May 11, 2010

(54) LIGHT CONTROL MATERIAL AND LIGHT CONTROL FILM

(75) Inventors: Kazuyuki Yahara, Osaka (JP); Kenji Tsuchihara, Ibaraki (JP)

(73) Assignees: Sekisui Chemical Co., Ltd., Osaka (JP); National Institute of Advanced Industrial Science and Technology, Tokyo (JP)

( * ) Notice: Subject to any disclaimer, the term of this patent is extended or adjusted under 35 U.S.C. 154(b) by 78 days.

(21) Appl. No.: 12/085,373

(22) PCT Filed: Nov. 24, 2006

(86) PCT No.: PCT/JP2006/323461

§ 371 (c)(1),
(2), (4) Date: Jul. 11, 2008

(87) PCT Pub. No.: WO2007/061061

PCT Pub. Date: May 31, 2007

(65) Prior Publication Data

US 2009/0080056 A1    Mar. 26, 2009

(30) Foreign Application Priority Data

Nov. 25, 2005    (JP)    ............................. 2005/340566

(51) Int. Cl.
*G02F 1/153* (2006.01)
*G02B 5/22* (2006.01)
*C08F 112/06* (2006.01)
*C08F 16/16* (2006.01)

(52) U.S. Cl. ................... 359/275; 526/347.1; 526/334; 359/885

(58) Field of Classification Search ................. 359/275, 359/885; 526/347.1, 334; 430/507
See application file for complete search history.

(56) References Cited

FOREIGN PATENT DOCUMENTS

| JP | 3-246505 | 11/1991 |
|---|---|---|
| JP | 4-114106 | 4/1992 |
| JP | 5-164916 | 6/1993 |
| JP | 9-227860 | 9/1997 |
| JP | 2001-174627 | 6/2001 |
| JP | 2002-082364 | 3/2002 |
| JP | 2002-139619 | 5/2002 |
| JP | 2002-155215 | 5/2002 |
| JP | 2002-214653 | 7/2002 |
| JP | 2005-076019 | 3/2005 |
| JP | 2005-105131 | 4/2005 |

OTHER PUBLICATIONS

International Search Report issued Feb. 13, 2007 in the International (PCT) Application of which the present application is the U.S. National Stage.

*Primary Examiner*—William C Choi
*Assistant Examiner*—Jack Dinh
(74) *Attorney, Agent, or Firm*—Wenderoth, Lind & Ponack, L.L.P.

(57) ABSTRACT

The present invention aims to provide a light control material capable of optionally controlling the light transmittance in an arbitrary wavelength range among a wide wavelength range, and a light control film formed by using the light control material.

8 Claims, 7 Drawing Sheets

[Fig. 1]
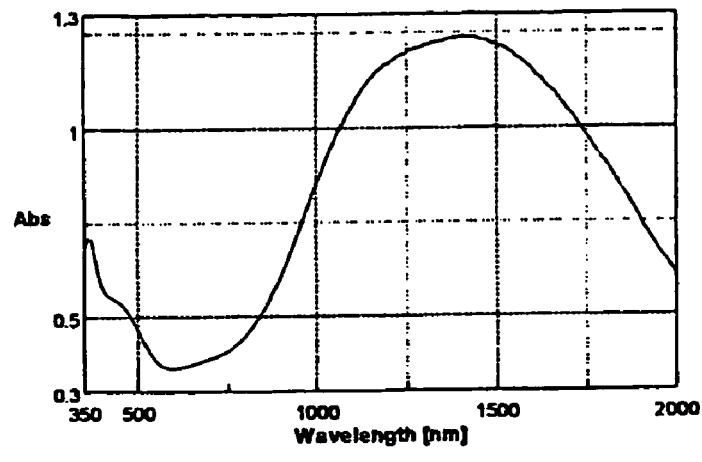
iron (III) chloride 1 6 %
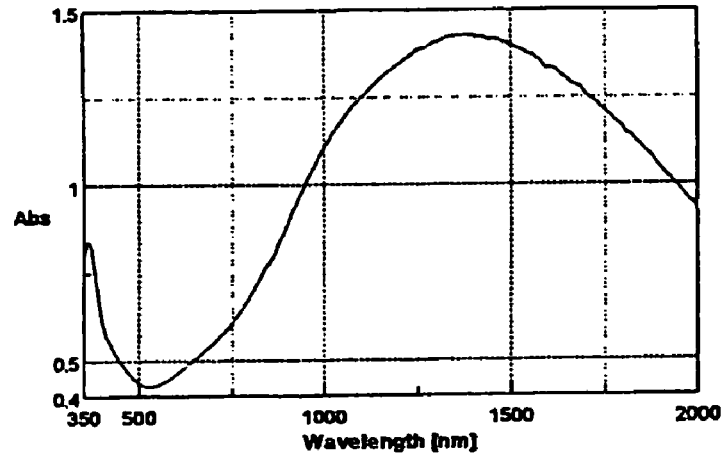
iron (III) chloride 3 0 %
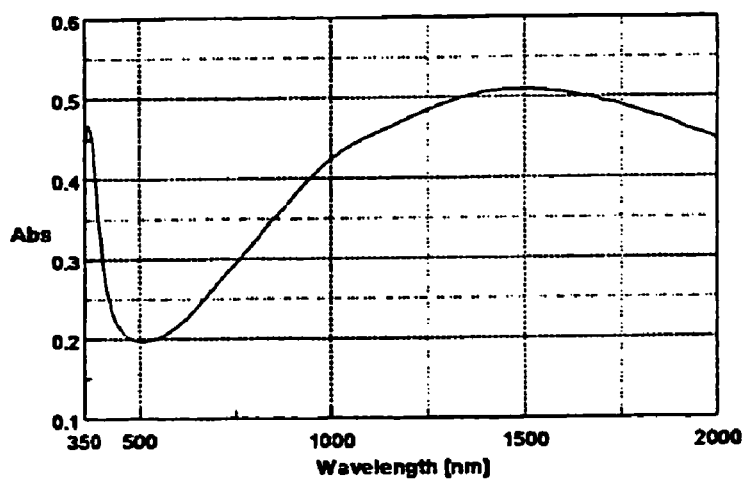
iron (III) chloride 5 0 %

[Fig. 2]
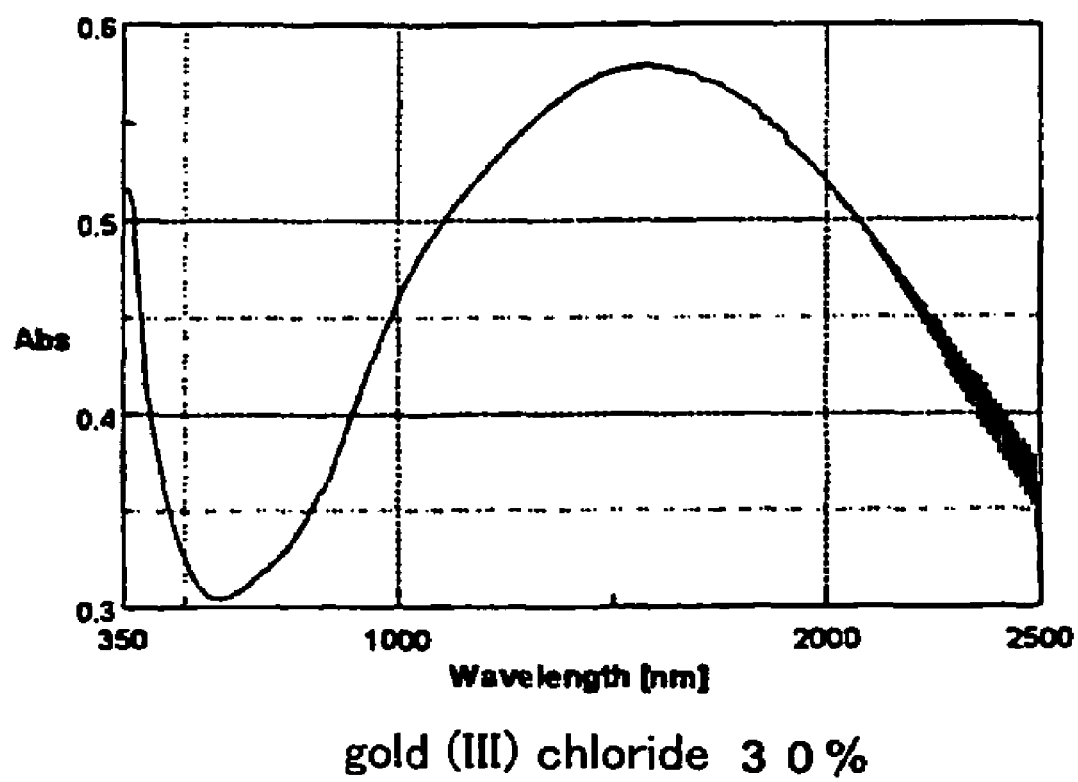
gold (III) chloride 3 0 %

[Fig. 3]
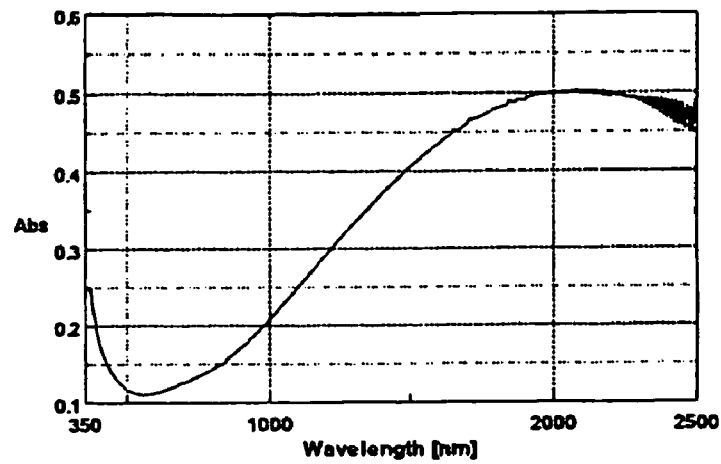
iron (III) chloride 3 0 %
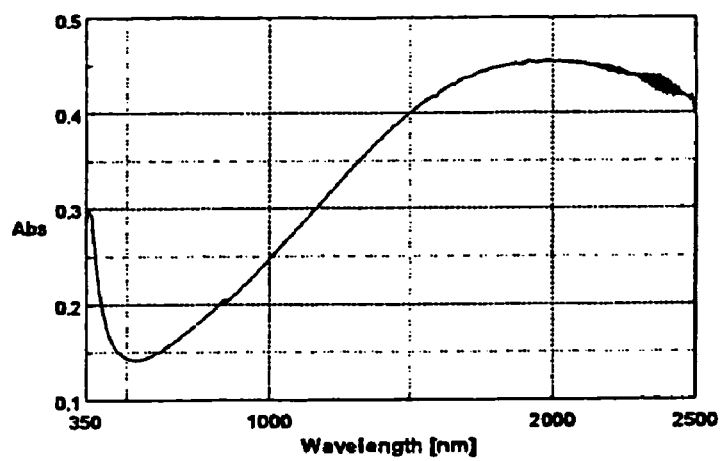
iron (III) chloride 5 0 %
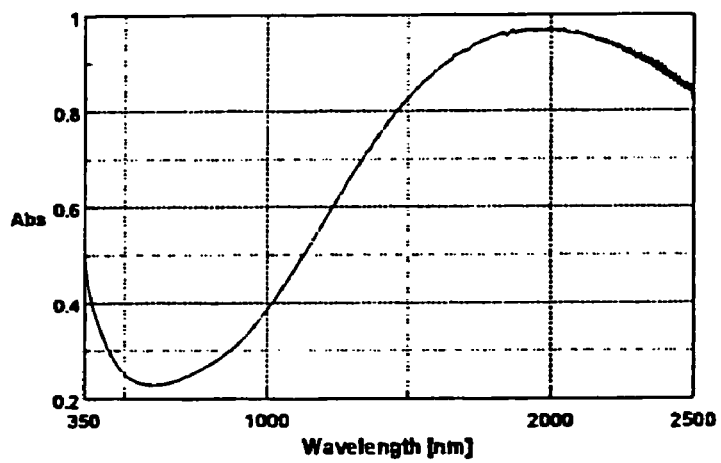
gold (III) chloride 3 0 %

[Fig. 4]
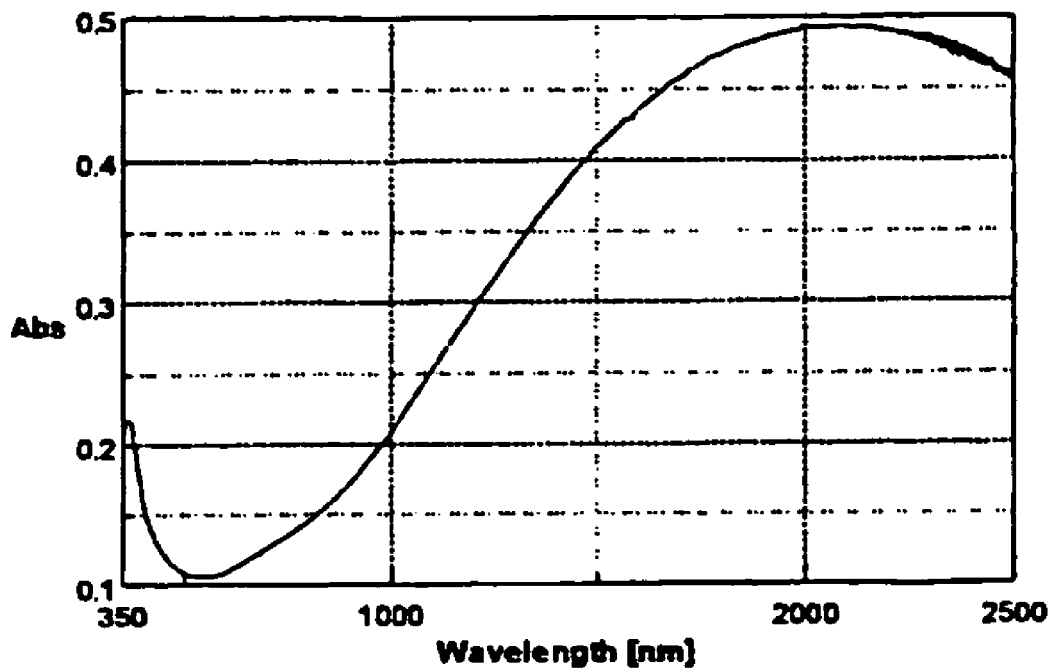
iron (III) chloride 3 0 %
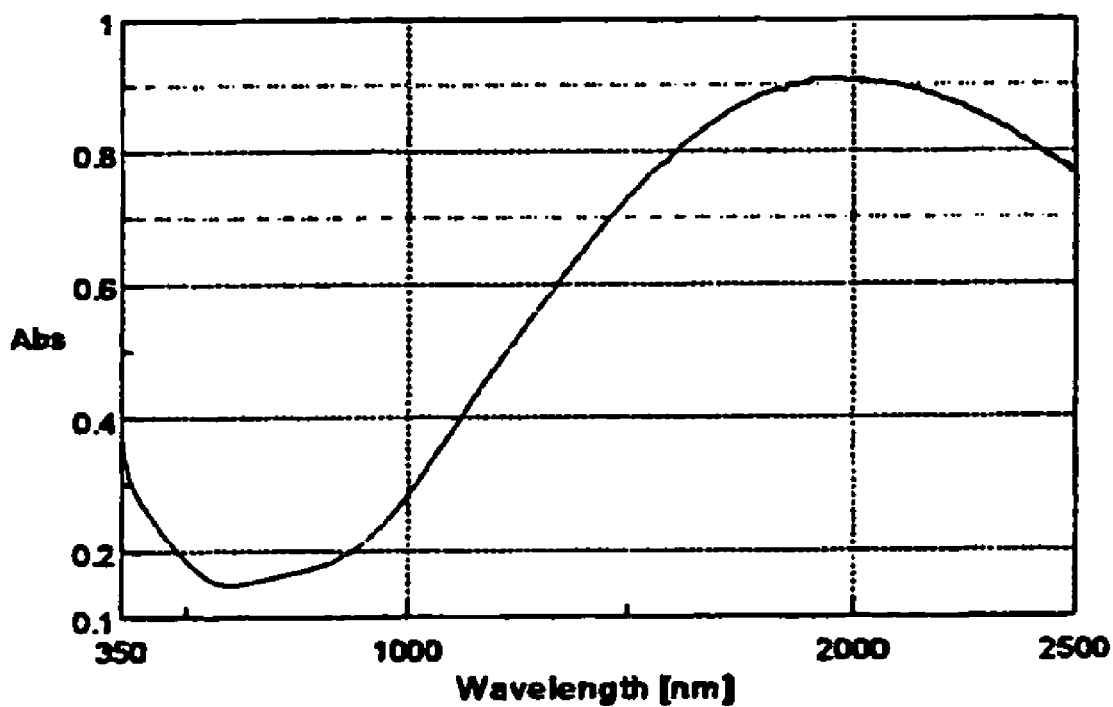
gold (III) chloride 2 0 %

[Fig. 5]
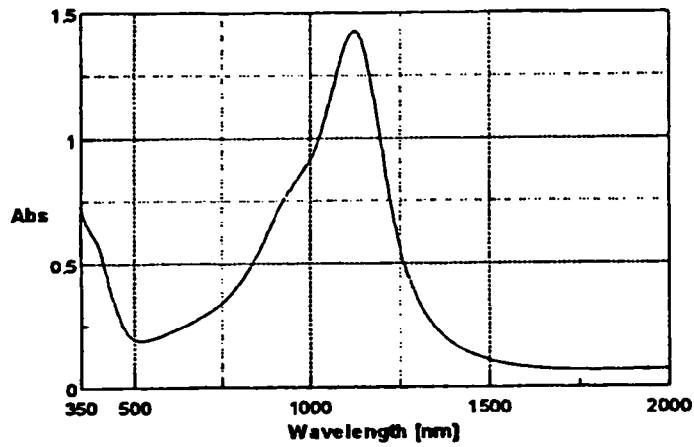
10 min. exposure to nitric acid vapor
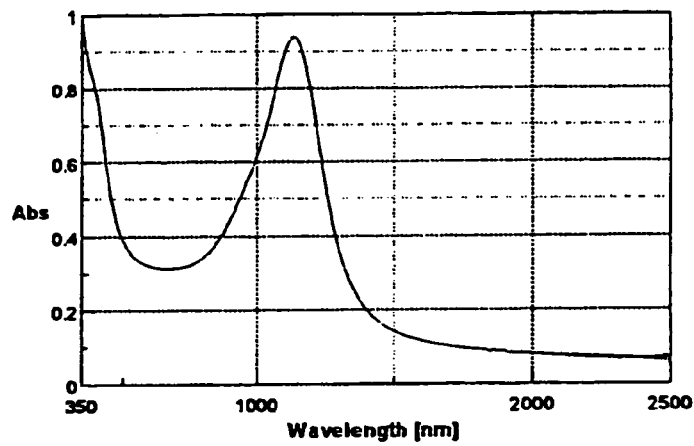
gold (III) chloride 2 0 %
[Fig. 6]
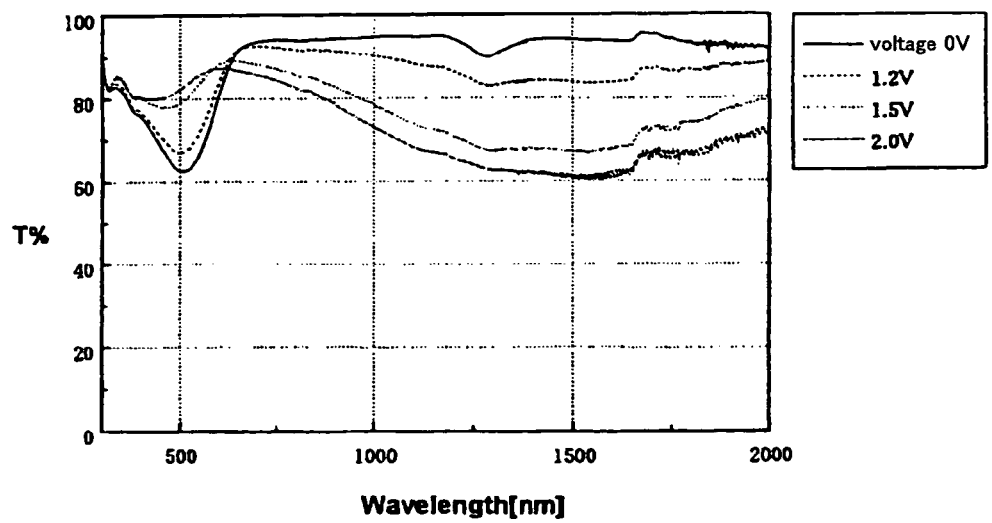

[Fig. 7]
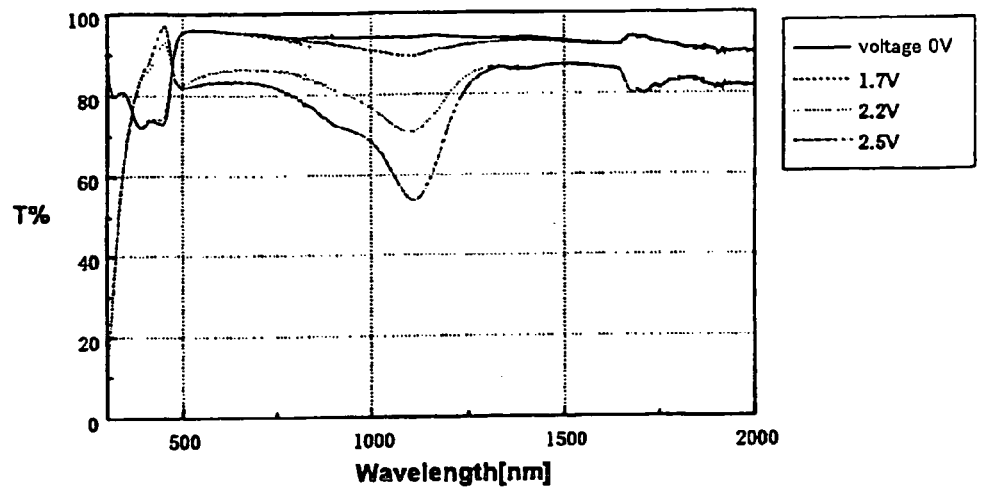
[Fig. 8]
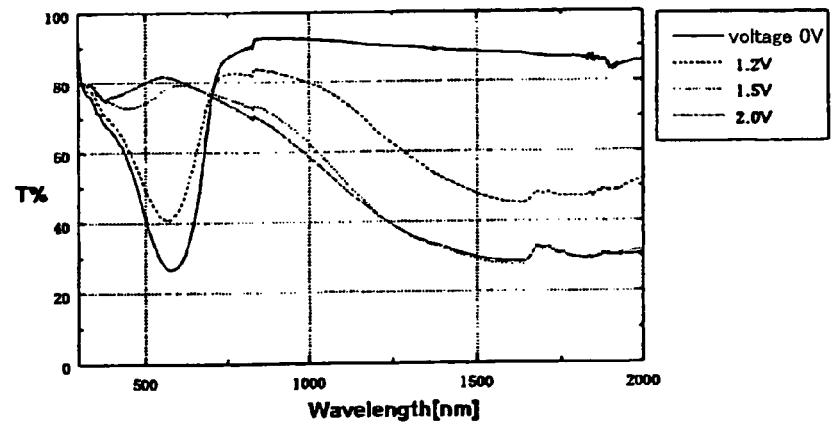
[Fig. 9]
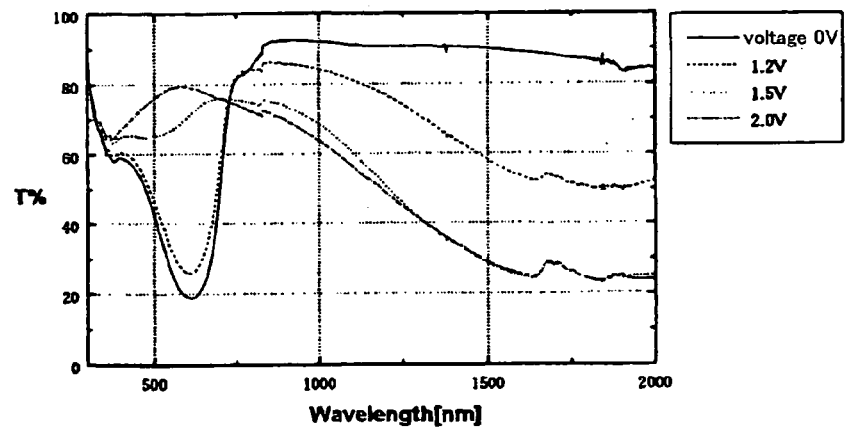

[Fig. 10]
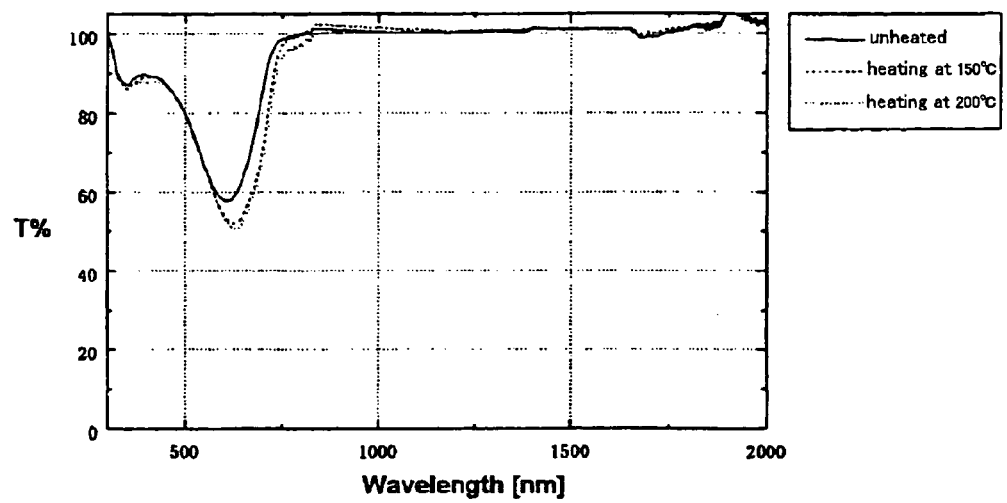
[Fig. 11]
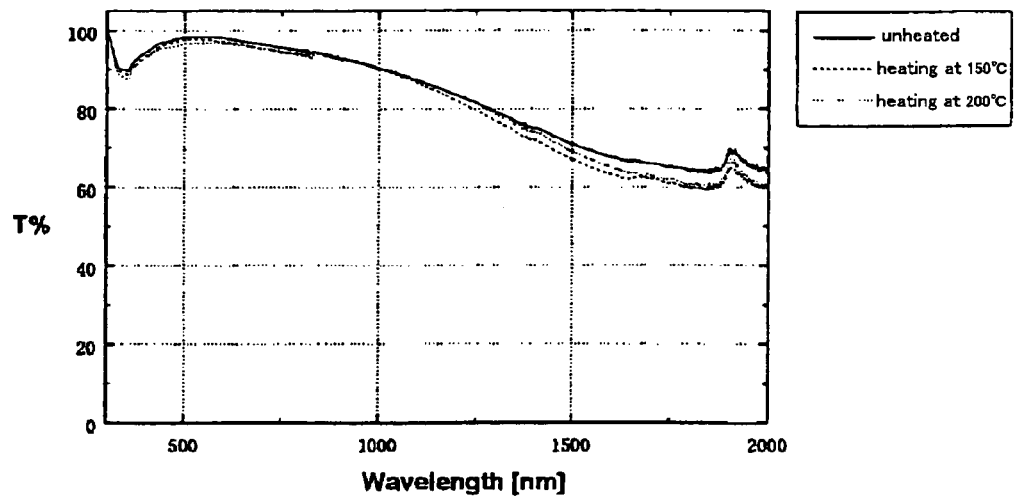

LIGHT CONTROL MATERIAL AND LIGHT CONTROL FILM

This application is a U.S. national stage of International Application No. PCT/JP2006/323461 filed Nov. 24, 2006.

TECHNICAL FIELD

The present invention relates to a light control material capable of optionally controlling the light transmittance in an arbitrary wavelength range among a wide wavelength range, and also relates to a light control film formed by using the light control material.

BACKGROUND ART

A light control material capable of controlling the light transmittance in a specific wavelength range has been utilized for controlling transmitted light or for controlling color by interrupting light of a specific wavelength, and applied in various fields including, for example, interior materials, construction materials, electronic parts, and the like. Furthermore, in these days, materials capable of controlling the light transmittance in the infrared range have attracted attention and a variety of investigations on such materials have been conducted.

As examples of the light control materials of this kind, Patent Document 1 and Patent Document 2 propose a light control material containing a suspension of light-polarizing particles and a polymer resin. In a light control body formed by using the light control material, the polarizing particles are disposed to form a translucent form in response to an electric field. However, this kind of light control material has a problem that it is not possible to optionally and easily control the light transmittance in an arbitrary wavelength range among a sufficiently wide wavelength range from the visible light range to the near-infrared range.

Patent Document 3 and Patent Document 4 disclose a heat ray shielding light control material which is characterized by that a polymer gel that changes its volume depending on temperatures is used, and that a colorant and an infrared absorbing material are included in the polymer gel. A light control body formed by using this kind of light control material can control the transmittance of heat rays (near-infrared rays) in response to temperature due to the behavior of the infrared absorbing material, and also the transmittance in the visible light range can be controlled by the colorant. However, this kind of light shielding material has a problem that it is not possible to optionally and easily control the light transmittance in an arbitrary wavelength range in a sufficiently wide wavelength range from the visible light range to the near-infrared range.

Patent Document 5 discloses an electrochromic thin film consisting of a niobium oxide, and describes that the electrochromic thin film shows an excellent light controlling property in a wide wavelength range. However, when an inorganic oxide of this kind is used as a light control material, complicated steps need to be carried out to produce a light control element, thus leaving a problem for practical application.

With respect to the light control material for controlling the light transmittance in the infrared range, for example, Patent Document 6 discloses a material containing a diimonium salt compound having an infrared absorption and a polyester; Patent Document 7 discloses a coating liquid containing a dioxadinaphthopentacene compound having an infrared absorption and a binder resin; and Patent Document 8 discloses a heat shielding coating material using an infrared-absorbing perylene based pigment. However, those light control materials have a problem in dispersibility of the infrared absorbing compound in a binder resin, and due to uneven dispersion, uniform absorption characteristics may not be easily achieved.

Patent Document 1: Japanese Kokai Publication No. 2005-105131
Patent Document 2: Japanese Kokai Publication No. 2002-214653
Patent Document 3: Japanese Kokai Publication No. 2002-155215
Patent Document 4: Japanese Kokai Publication No. 2002-082364
Patent Document 5: Japanese Kokai Publication No. Hei-9-227860
Patent Document 6: Japanese Kokai Publication No. 2001-174627
Patent Document 7: Japanese Kokai Publication No. 2002-139619
Patent Document 8: Japanese Kokai Publication No. 2005-076019

DISCLOSURE OF THE INVENTION

Problems to be Solved by the Invention

In light of the above-mentioned current situation, a purpose of the present invention is to provide a light control material capable of optionally controlling the light transmittance in an arbitrary wavelength range among a wide wavelength range, and a light control film formed by using the light control material.

Means for Solving the Problems

The present invention is a light control material, which contains a stimulus sensitive resin and is capable of controlling the light transmittance in a specific wavelength range, the stimulus sensitive resin being a polyacetylene compound having a repeating unit represented by the following general formula (1) or general formula (2).

[Chemical Formula 1]

(1)

In the formula (1), $R^1$ represents a naphthalene group, a phenanthrene group, a pyrenyl group or an anthracene group, each of the four groups being substituted by a group selected from the group consisting of: an alkyl group having 1 to 40 carbon atoms, an alkoxy group (with an alkyl group having 1 to 40 carbon atoms), an $SR^4$ group ($R^4$ represents a hydrogen atom or an alkyl group having 1 to 40 carbon atoms), an $NR^5R^6$ group ($R^5$ and $R^6$ may be the same or different, and each represents a hydrogen atom or a group selected from alkyl groups having 1 to 40 carbon atoms), a cyano group, a carboxy group, a sulfoxyl group, an ester group, an amide group and $COR^7$ ($R^7$ represents an alkyl group having 1 to 40 carbon atoms).

[Chemical Formula 2]

(2)

In the formula (2), $R^2$ represents a naphthalene group or an anthracene group; $R^3$ represents a phenyl group substituted by a substituent X at the position m or the position p; and the substituent X represents a group selected from the group consisting of: an alkyl group having 1 to 20 carbon atoms, an alkoxy group (with an alkyl group having 1 to 20 carbon atoms), an $SR^4$ group ($R^4$ represents a hydrogen atom or an alkyl group having 1 to 20 carbon atoms), an $NR^5R^6$ group ($R^5$ and $R^6$ may be the same or different, and each represents a hydrogen atom or a group selected from alkyl groups having 1 to 20 carbon atoms), a cyano group, a carboxy group, a sulfoxyl group, an ester group, an amide group and $COR^7$ ($R^7$ represents an alkyl group having 1 to 20 carbon atoms).

The following description will discuss the present invention in more detail.

As a result of intensive investigations, the present inventors have found that a polyacetylene compound having a specific structure can control the light transmittance of a significantly wide wavelength range by chemical or electric stimulus or physical stimulus such as a change of a pressure or a temperature, thereby completing the present invention.

The light control material of the present invention contains a stimulus sensitive resin, which is a polyacetylene compound having a repeating unit represented by the above-mentioned general formula (1) or general formula (2). When the light control material containing the above-mentioned polyacetylene compound has one or more polycyclic aromatic side chains, the light control material can change the light transmittance in a wide wavelength range in response to chemical stimulus or electric stimulus, or physical stimulus such as a change of a pressure or a temperature.

Out of the polyacetylene compounds having the repeating unit represented by the general formula (1), a polyacetylene compound in which $R^1$ is a substituted naphthalene group is preferable. Having the naphthalene group as $R^1$ makes it possible to exert an excellent light absorption property in a sufficiently long wavelength range when stimulus is applied, and also makes it possible to preferably control the light transmittance of the near-infrared range.

A particularly preferable example of the substituent substituting $R^1$ includes a group with a straight chain alkyl group having 6 to 20 carbon atoms. By substitution with this type of substituent, the polyacetylene compound shows, when the below-mentioned stimulus is applied, a high absorption in the near-infrared range, and is preferably applicable for use of shielding near-infrared rays. Moreover, it is possible to optionally control the amount of absorption and the wavelength in the near-infrared range by selecting the substituent. Furthermore, since the repetition endurance of the light control material of the present invention is particularly improved, the light control material is very useful as a light control material for controlling light by applying an external stimulus with repetitive frequency such as electric stimulus.

Furthermore, the color contrast due to presence or absence of stimulus can be enhanced.

On the other hand, in the case where a branched alkyl group is used as a substituent for substituting $R^1$ or as a substituent for substituting $R^3$, the solubility of the polyacetylene compound having the repeating unit represented by the general formula (1) or (2) to a solvent can be improved. Therefore, the light control material of the present invention is preferably a copolymer containing the repeating units represented by the general formula (1) or (2), each having a different substituent for substituting $R^1$ or $R^3$ with one another, at an appropriate blending ratio by taking into consideration the desired light absorption property and solubility to the solvent.

Preferable examples of the polyacetylene compound containing the repeating unit represented by the general formula (1) or (2) include polyacetylene compounds containing a repeating unit represented by the following formula (1-1), (1-2), (1-3), (1-4), (1-5) or (2-1), although not particularly limited thereto. This is because, those polyacetylene compounds are especially soluble in a solvent, and have a high absorption in the near-infrared range. Moreover, out of the compounds mentioned below, specifically, a repeating unit represented by the below-mentioned formulae (1-3), (1-4) and (1-5) contain a naphthalene group which is substituted by a straight chain alkyl group having 6 to 18 carbon atoms, and the polyacetylene compounds are very useful as a light control material to control light by applying an external stimulus with repetitive frequency such as electric stimulus.

[Chemical Formula 3]

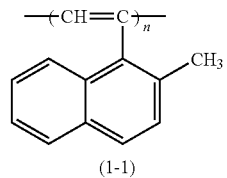

(1-1)

[Chemical Formula 4]

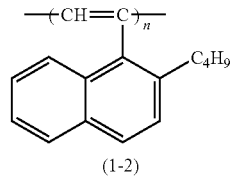

(1-2)

[Chemical Formula 5]

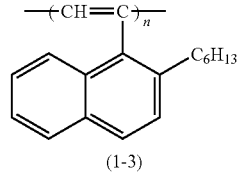

(1-3)

[Chemical Formula 6]

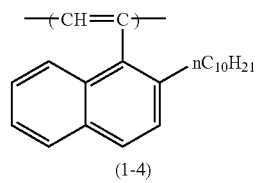

(1-4)

[Chemical Formula 7]

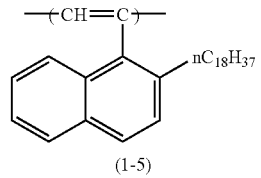

(1-5)

[Chemical Formula 8]

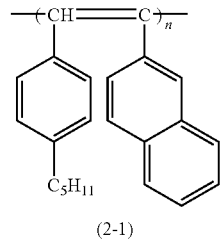

(2-1)

When a substituent containing a chiral center carbon atom is used as the substituent for substituting $R^1$ or the substituent for substituting R³, the on/off switching based on circular dichroism can be achieved in a reversible manner by chemical stimulus or electric stimulus, or physical stimulus such as pressure and temperature, and thus use as a polarized filter can also become possible. Examples of the substituent having a chiral center carbon atom include the repeating unit represented by the following formula (1-6) or (1-7), and the like.

[Chemical Formula 9]

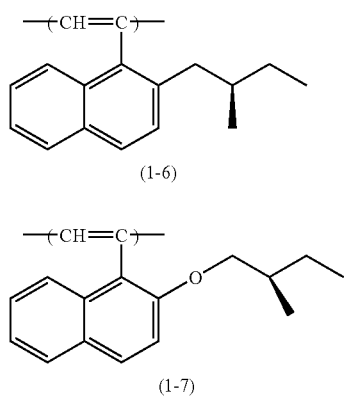

(1-6)

[Chemical Formula 10]

(1-7)

In the polyacetylene compound having the repeating unit represented by the general formula (1) or the general formula (2), the number of repetition of the repeating unit is not particular limited; however, the preferable lower limit is 5 and the preferable upper limit is 100,000. In the case of less than 5, a sufficient color controlling function may not be exerted, whereas in the case of more than 100,000, the solubility may be lowered. The more preferable lower limit is 10, and the more preferable upper limit is 1000.

The above-mentioned stimulus sensitive resin may have a repeating unit that is other than the repeating unit represented by the formula (1) or the formula (2).

The repeating unit other than the repeating unit represented by the formula (1) or the formula (2) is not particularly limited, and examples thereof include phenylacetylene, diphenylacetylene, styrene, and the like.

In the case where the stimulus sensitive resin has the repeating unit other than the repeating unit represented by the formula (1) or the formula (2) as mentioned above, the preferable lower limit of the content of the repeating unit represented by the formula (1) or the formula (2) is 90 mol %. In the case of less than 90 mol %, a sufficient light control function may not be exerted. The more preferable lower limit is 98 mol %.

As a method of producing the polyacetylene compound having the repeating unit represented by the general formula (1) or the general formula (2), for example, a method including mixing a monomer material, a catalyst and a solvent under dry nitrogen atmosphere, allowing the mixture to polymerize for a predetermined time at a room temperature or a predetermined temperature, and stopping the polymerization reaction by adding a large amount of methanol to deposit polymers, and the like can be exemplified, although not particularly limited thereto.

In the case where the above-mentioned stimulus sensitive resin has a repeating unit that is other than the repeating unit represented by the formula (1) or the formula (2), a monomer such as phenylacetylene, diphenylacetylene and styrene may be concomitantly used as the monomer material.

Preferable examples of the above-mentioned catalyst include $WCl_6$, $WBr_6$, $WI_6$, $WF_6$, $W(CO)_6$, $MoCl_5$, $CrCl_3$, $TaCl_5$, $NbCl_5$, $MnCl_3$, $RuCl_3$, $RhCl_3$ and the like, although not particularly limited thereto.

Examples of the above-mentioned solvent include toluene, chloroform, carbon tetrachloride and the like, although not particularly limited thereto. It is preferable to use the solvent that has been dehydrated by a conventionally known method so as not to inhibit the polymerization reaction.

The above-mentioned polymerization method is not particularly limited, and for example a method including introducing a predetermined amount of each compound into a reactor vessel in which a stirrer is disposed, etc., and mixing those compounds at a constant temperature, and the like can be exemplified.

The polymerization temperature may be at a room temperature or may be heated to about 80° C.

The light control material of the present invention may include a stimulus sensitive resin that is other than the polyacetylene compound mentioned above, as a stimulus sensitive resin. Examples of such stimulus sensitive resins include a polyaniline compound, a polythiophene compound, a polypyrrole compound, and the like, although not particularly limited thereto.

The light control material of the present invention may contain other resins in order to improve moldability or mechanical strength of the molded products.

The above-mentioned other resins are not particularly limited as long as they have a high transparency and a good mixing characteristics with the above-mentioned stimulus sensitive resin, and examples thereof include polyolefins, polyacrylates, polymethacrylates, polyesters, polyamides, polycarbonates, and the like.

The light control material of the present invention may contain an oxidizing agent and/or a reducing agent, in addition to the stimulus sensitive resin. By containing an oxidizing agent and/or a reducing agent, the oxidizing agent and/or the reducing agent act as a chemical stimulus to the stimulus sensitive resin, with the effect that the transparency at an arbitrary wavelength can be controlled.

Examples of the oxidizing agent include nitric acid, hydrochloric acid, sulfuric acid, iodine, chlorine, iron (III) chloride, iron (III) bromide, copper (II) chloride, tin (IV) chloride, gold (III) chloride, lithium perchlorate, copper perchlorate, and the like, although not particularly limited thereto.

Examples of the reducing agent include sodium thiosulfate, sodium nitrite, sulfurous acid, hydrogen sulfide, dithionous acid, sodium dithionite, hydrazine, phenyl hydrazine, hydrazine hydrochloride, and the like, although not particularly limited thereto.

In the case where any of the polyacetylene compounds of the above-mentioned formula (1-1), (1-2), (1-3), (1-4) or (1-5) is contained as the stimulus sensitive resin, it is preferable to use a halide of a transition metal such as iron (III) chloride, iron (III) bromide, copper (II) chloride and gold (III) chloride, among the above-mentioned oxidizing agents. By using those oxidizing agents, it is possible to obtain a light control material showing a large change in the transmittance. The more preferable oxidizing agents are gold (III) chloride and iron (III) chloride.

In the case where the polyacetylene compound of the formula (2-1) is contained as the stimulus sensitive resin, it is preferable to use a halide of a transition metal such as iron (III) chloride, iron (III) bromide, copper (II) chloride and gold (III) chloride, or nitric acid, among the above-mentioned oxidizing agents. By using those oxidizing agents, it is possible to obtain a light control material showing a large change in the transmittance. The more preferable oxidizing agent is gold (III) chloride.

The method of adding the oxidizing agent and/or the reducing agent to the light control material of the present invention is not particularly limited and, for example, a method including adding the oxidizing agent and/or the reducing agent directly, or adding a solution of the oxidizing agent and/or the reducing agent, in a solution prepared by dissolving the polyacetylene compound in an appropriate solvent such as toluene, chloroform and carbon tetrachloride so as to bring the stimulus sensitive resin into contact with the oxidizing agent and/or the reducing agent in a liquid phase, may be preferably used.

In the case where addition of the oxidizing agent and/or the reducing agent is carried out in the above-mentioned manner, by changing the kinds of the stimulus sensitive resin, the kinds of the oxidizing agent and/or the reducing agent, and the concentration thereof in the solution, it is possible to arbitrarily control the wavelength range where the light transmittance changes as well as the light transmittance. Moreover, in the case where the light control film is produced according to the method mentioned below, by using the light control material whose light transmittance has been arbitrarily controlled as mentioned above, it is possible to produce a light control film having a desired light controlling property.

In the method of adjusting the light transmittance of an arbitrary wavelength by adding the oxidizing agent and/or the reducing agent, the relationship between the addition amount of the oxidizing agent and/or the reducing agent and the light transmittance is specifically described as follows: that is, for example, in the case where the stimulus sensitive resin is any of the polyacetylene compounds having a repeating unit represented by the formula (1-1), (1-2), (1-3), (1-4), (1-5) or (2-1), by adding iron (III) chloride to a chloroform solution of the stimulus sensitive resin in such a manner that the blending quantity of the oxidizing agent relative to polyacetylene in the light control material is 5 to 300% by weight, the light transmittance of the visible light range is changed so that color changes can be generated by the light control. On the other hand, by adding iron (III) chloride to a chloroform solution of the stimulus sensitive resin in such a manner that the final concentration of the iron (III) chloride is 20 to 100% by weight, the light transmittance of the near-infrared range can be changed (lowered).

The light control material of the present invention may contain, if necessary, a conventionally known additive such as, for example, an antioxidant and an ultraviolet absorber, within a range in which the object of the present invention is not limited.

The method of producing the light control material of the present invention is not particularly limited, and examples thereof include a method of uniformly mixing the stimulus sensitive resin with the optionally added oxidizing agent, reducing agent and various additives, each at a predetermined blending amount, in the solvent, and the like.

An application use of the light control material of the present invention is not particularly limited, and for example, by increasing the light absorption in the visible light range, it is possible to be used as a coating agent for optical components such as various kinds of filters, or as a coating agent for various kinds of display elements, or the like. Moreover, use as a display material is also possible. On the other hand, by increasing the light absorption in the near-infrared range or the infrared range, it is possible to be used as a barrier coating or as a coating agent for near-infrared ray shielding for various kinds of display panels. Furthermore, the light control material of the present invention may be formed into a film to be used as a light control film. The light control film, which comprises the light control material of the present invention is also included in the present invention.

An embodiment of the light control film of the present invention is not particularly limited, and may be, for example, a film-formed body produced by forming the above-mentioned light control material into a film, or those produced by forming a film-formed body by using the light control material on a substrate. Moreover, an embodiment in which the film-formed body formed by using the light control material is interposed between two sheets of the substrate may be possible. Furthermore, an embodiment of the light control film, in which the light control material is not formed into a film and is sealed between two sheets of the substrate, may be possible.

The substrate is not particularly limited; however, in consideration of features of light control films, a transparent substrate is preferable. Examples of the transparent substrate include a glass plate such as soda-lime glass, lead glass, borosilicate glass and silica glass; a resin plate such as a homopolymer, a copolymer, or a polymer blend of polyacryls, vinyl-based resins, polyolefins, polyesters, polyamides, polycarbonates, epoxy-based resins, acetal-based resins and the like; or the like. Moreover, a flexible substrate such as polyesters, polyimides, polyether ketone, polyethersulfone, and polyethylene terephthalate can be used preferably.

The light control film of the present invention may have a single body consisting of a film formed with the above-mentioned light control material and/or a substrate only, or may have a laminated body consisting of a film formed with the above-mentioned light control material and another film.

The above-mentioned another film is not particularly limited, and an example thereof includes a film that shows a new function as a laminated body or improves functions of the film formed with the light control material when laminated with the film formed with the light control material.

Examples of the above-mentioned other film include a resin film made of a polyolefin, a polyester, a polybutyral or the like, a film made of electrolyte layers, and the like.

The thickness of the light control film of the present invention is not particularly limited; however, the preferable lower limit is 100 Å, and the preferable upper limit is 10 μm. In the case of less than 100 Å, sufficient light control functions may not be exerted, whereas in the case of more than 10 μm, the visible light transmittance is reduced and thus the transparency may be lost.

The method of producing the light control film of the present invention is not particularly limited, and for example, a method including coating of the light control material of the present invention on a release film or the above-mentioned substrate, and thereafter carrying out drying can be exemplified.

The coating method is not particularly limited, and a conventionally known method such as a spin coating method and a casting method can be used.

Since the light control film of the present invention is formed with a light control material containing a stimulus sensitive resin, the light control film can change the light transmittance in a wide wavelength range in response to chemical stimulus or electric stimulus, or physical stimulus such as pressure or temperature.

The light control body, which has the light control film of the present invention and a means for providing an external stimulus is also included in the present invention.

The method of providing a chemical stimulus to the light control film of the present invention is not particularly limited, and a method of bringing the light control film of the present invention into contact with an oxidizing agent and/or a reducing agent can be exemplified.

The contact method is not particularly limited, and examples thereof include: a method of immersing the light control film of the present invention in a solution of the oxidizing agent and/or the reducing-agent for a time period long enough to provide a desired change in the transmittance; a method of bringing the light control film of the present invention into contact with steam containing the oxidizing agent and/or the reducing agent; and the like. It is possible to obtain the light control film having a desired light controlling property by adjusting types of the oxidizing agent and/or the reducing agent or the concentration of the solution thereof, the contacting time, and the like.

Meanwhile, the oxidizing agent and the reducing agent to be used here are not particularly limited, and for example, an oxidizing agent and a reducing agent which are similar to those mentioned above can be used. With regard to the combination of the stimulus sensitive resin with the oxidizing agent and/or the reducing agent, combinations that are similar to the above-mentioned preferable combinations are preferably applied.

The method of providing electric stimulus to the light control film of the present invention is not particularly limited, and for example, a method including sandwiching a lamination body of the light control film of the present invention and an electrolyte layer between a pair of electrode substrates, and applying a voltage between the substrates, and the like can be exemplified.

The above-mentioned electrode substrate is not particularly limited, and an electrode substrate in which a transparent electrode film is formed on a conventionally known transparent substrate, and the like may be used. Examples of the transparent substrate include glass, a resin and the like, although not particularly limited thereto.

Examples of the above-mentioned glass include soda-lime glass, lead glass, borosilicate glass, silica glass and the like, although not particularly limited thereto. On the other hand, examples of the above-mentioned resin include a resin plate such as a homopolymer, a copolymer, and a polymer blend of polyacryls, vinyl-based resins, polyolefins, polyesters, polyamides, polycarbonates, epoxy-based resins, acetal-based resins and the like, or the like, although not particularly limited thereto. Moreover, a flexible substrate such as polyesters, polyimides, polyether ketone, polyethersulfone, and polyethylene terephthalate can also be preferably used.

The above-mentioned transparent electrode film is not particularly limited, and a transparent electrode film formed with a conventionally known transparent conducting film, and the like can be exemplified. Examples of the transparent conducting film include: a thin film of a metal such as gold, silver, chromium, copper, and tungsten; a film formed with a metal oxide such as ITO, tin oxide, and zinc oxide; a film formed with a conductive polymer compound such as polypyrrole, polyacetylene, polythiophene, polyparaphenylene vinylene, polyaniline, polyacene, and polyethylenedioxythiophene; and the like, although not particularly limited thereto.

An electrolyte forming the electrolyte layer is not particularly limited, and examples thereof include: a thin layer of inorganic dielectric such as tantalum oxide, niobium oxide and titanium oxide; a polymer electrolyte formed with a combination of an electrolyte including an inorganic ion salt such as an alkali metal salt (e.g. lithium perchlorate, tetraethylammonium tetrafluoroborate, lithium iodide and the like) and an alkali earth metal salt, a quaternary ammonium salt, and a cyclic quaternary ammonium salt, with a solid conductive compound such as polyvinyl alcohol, polyvinyl butyral, polyethylene oxide, polyoxyethylene methacrylate, polystyrene sulfonate, a polymer having polyglycol backbone and the like; an electrolyte solution layer obtained by dissolving the above-mentioned polymer electrolyte in an organic solvent such as acetonitrile, nitromethane, propylene carbonate, and ethylene carbonate; and the like.

As mentioned above, the light control body, wherein a lamination body of the light control film and an electrolyte layer is sandwiched between a pair of electrode substrates, and the external stimulus is an electric stimulus, is also included in the present invention.

The method of providing a temperature stimulus to the light control film of the present invention is not particularly limited, and for example, a method including heating the light control film of the present invention to a temperature of 80 to 300° C., or more desirably 150 to 250° C., and the like can be exemplified. Heating under this temperature condition changes the molecular structure forming the light control film, causing the improvement in the regularity of the primary structure or the high-order structure. As a result of this, absorption wavelength of the light control film in the visible light range can be shifted to the long wavelength side, and the light transmittance can be easily changed. Since control of the light transmittance of the light control film by the temperature stimulus is attributed to the change in the molecular structure, it is possible to control the light transmittance of the light control film of the present invention in an irreversible manner by selecting a temperature and the like.

The light control film and the light control body of the present invention can optionally control the transmittance of light in an arbitrary wavelength among a wide wavelength range. An application of the light control film and the light control body is not particularly limited, and by adjusting the absorption of light in the visible light range, the light control film and the light control body can be used as optical components such as various kinds of color filters, a window material for vehicles, a window material for buildings, or a material for eye glasses. Furthermore, by reducing the transmittance in the near-infrared range or in the infrared range, the light control film and the light control body can be used as a near-infrared absorption filter for various kinds of panels, or as various kinds of screens, a window material for vehicles, a window material for buildings, and the like.

EFFECTS OF THE INVENTION

The present invention can provide a light control material capable of optionally controlling the light transmittance in an arbitrary wavelength range among light transmittance in a wide wavelength range, and a light control film formed by using the light control material. Moreover, by selecting a condition for providing a stimulus, the light control film can be used as a light control film having an excellent visibility and an excellent heat shielding property.

BEST MODE FOR CARRYING OUT THE INVENTION

Hereinafter, embodiments of the present invention will be described in more detail with reference to examples; however, the present invention is not limited to the examples.

Example 1

(1) Preparation of poly(1-ethynyl-2-methylnaphthalene)

To 20 mL of triethylamine were added 10 g of 1-bromo-2-methylnaphthalene, 0.63 g of dichlorobis(triphenylphosphine)palladium, 0.24 g of triphenylphosphine, 0.24 g of copper bromide, 0.95 g of lithium bromide, and 7.6 g of 3-methyl-1-butyn-3-ol, and reacted at 90° C. for 8 hours.

After removing the solvent by an evaporator, ethyl ether was added to the resulting solution to extract the generated compound. The ethyl ether layer was washed with 300 mL of distilled water for three times, dried over anhydrous magnesium sulfate for 24 hours, followed by filtration and removal of the solvent in the filtrate solution by evaporation, and then the resulting product was purified on a column using acetic acid/hexane (1/4) as a developing solvent.

Next, 30 mL of diethylene glycol and 4.4 g of potassium hydroxide were added to the compound obtained, and stirred at 90° C. for 15 hours. Ethyl ether was added to the resulting solution to extract the generated compound. The ethyl ether layer was washed twice with 300 mL of distilled water and dried over anhydrous magnesium sulfate for 24 hours, followed by filtration and the removal of the solvent. The resulting product was purified on a column using hexane as a developing solvent, thereby 3.5 g of 1-ethynyl-2-methylnaphthalene was obtained. The obtained 1-ethynyl-2-methylnaphthalene was analyzed by $^1$H-NMR (270 MHz, CDCl$_3$), and the NMR spectra showed peak at δ 8.3 (1H), 7.8 (2H), 7.5 (3H), 3.7 (1H), 2.6 (3H).

Next, 0.39 g of the obtained 1-ethynyl-2-methylnaphthalene was polymerized with a WCl$_6$ catalyst so that 0.21 g of poly(1-ethynyl-2-methylnaphthalene) was obtained.

(2) Production of Light Control Material and Light Control Film

The obtained poly(1-ethynyl-2-methylnaphthalene) was dissolved in chloroform so as to prepare a chloroform solution containing 0.8% by weight of the poly(1-ethynyl-2-methylnaphthalene). Further, iron (III) chloride was added to the chloroform solution in the respective amounts of 16% by weight, 30% by weight and 50% by weight relative to the poly(1-ethynyl-2-methylnaphthalene), and then stirred, thereby three kinds of light control materials were obtained. Further, gold (III) chloride was added to the chloroform solution in an amount of 30% by weight relative to the poly(1-ethynyl-2-methylnaphthalene), and then stirred, thereby a light control material was obtained. The light control materials obtained above were each applied for coating on a glass substrate having a thickness of 0.1 mm by a spin coating method (800 rpm×10 minutes), and dried for 1 hour to form coating films, thereby light control films were obtained.

The light transmitting properties of the obtained light control films are as shown in FIGS. 1 and 2.

According to FIGS. 1 and 2, it is found that each of the obtained light control films has an absorption in a wide wavelength range, and that the light transmittance is optionally controllable by the types and amounts of the oxidizing agent. Moreover, it is found that the light control films have a high absorption band in the infrared range, and that the absorption wavelength changes depending on the types and addition amounts of the oxidizing agent.

Example 2

(1) Preparation of poly(1-ethynyl-2-n-hexylnaphthalene) acetylene

A 1.6 mol/L hexane solution of n-butyl lithium was added to 30 mL of a tetrahydrofuran solution of 3.0 g of ethynylnaphthalene at −50° C. under a nitrogen atmosphere, and the mixture was cooled to −90° C., and then 15 mL of a tetrahydrofuran solution of 2.5 g of potassium tert-butoxide was added thereto. After stirring at −80° C. for 1 hour, the temperature was raised up to 5° C. At −70° C., 3.3 g of bromohexane was dropped to the resulting solution, and stirred overnight at 30° C. 100 mL of water was dropped to the resulting solution at 0° C., and hexane was added thereto to extract the generated compound. The hexane layer was washed with 300 mL of distilled water for 3 times, dried over anhydrous magnesium sulfate for 24 hours, followed by filtration, and the solvent was removed by evaporation. And purification on the column was performed by using hexane as a developing solvent so that 2.2 g of 1-ethynyl-2-n-hexylnaphthalene was obtained. The obtained 1-ethynyl-2-n-hexylnaphthalene was analyzed by $^1$H-NMR (270 MHz, CDCl$_3$), and the NMR spectra showed peak at δ 8.3 (1H), 7.8 (2H), 7.5 (3H), 3.6 (1H), 3.0 (2H), 1.7 (2H), 1.3 (6H), 0.9 (3H).

Next, 0.35 g of the 1-ethynyl-2-n-hexylnaphthalene was polymerized with a WCl$_6$ catalyst so that 0.25 g of poly(1-ethynyl-2-n-hexylnaphthalene) was obtained.

(2) Production of Light Control Material and Light Control Film

The obtained poly(1-ethynyl-2-n-hexylnaphthalene) (5 mg) was dissolved in 0.37 mL of chloroform so as to prepare a chloroform solution containing 0.9% by weight of the poly (1-ethynyl-2-n-hexylnaphthalene). Further, 1.5 mg of iron (III) chloride was added to the chloroform solution in an amount of 30% by weight relative to the poly(1-ethynyl-2-n-hexylnaphthalene), and stirred at room temperature for 30 minutes, thereby a light control material was obtained. Furthermore, a light control material prepared by adding 2.5 mg of iron (III) chloride (50% by weight relative to the poly(1-ethynyl-2-n-hexylnaphthalene)), and a light control material prepared by adding 1.5 mg of gold (III) chloride (30% by weight relative to the poly(1-ethynyl-2-n-hexylnaphthalene)), were also obtained. Light control films were obtained in the same manner as in Example 1, except that the thus obtained light control materials were used.

The light transmitting properties of the obtained light control films are as shown in FIG. 3.

According to FIG. 3, it is found that each of the light control films has a high absorption band in the infrared range, and the absorption wavelength changes depending on the amount of doping of the iron (III) chloride.

Example 3

(1) Preparation of poly(1-ethynyl-2-n-butylnaphthalene)

Preparation of 1-ethynyl-2-n-butylnaphthalene was carried out in the same manner as Example 2, except that bromobutane was used in place of bromohexane, and by polymerizing the 1-ethynyl-2-n-butylnaphthalene, poly(1-ethynyl-2-n-butylnaphthalene) was obtained.

(2) Production of Light Control Material and Light Control Film

The obtained poly(1-ethynyl-2-n-butylnaphthalene) was dissolved in chloroform so as to prepare a chloroform solution containing 0.8% by weight of the poly(1-ethynyl-2-methylnaphthalene). Next, iron (III) chloride was added to the chloroform solution in an amount of 30% by weight relative to the poly(1-ethynyl-2-n-butylnaphthalene), and then stirred, thereby light control materials were obtained. Further, gold (III) chloride was added to the chloroform solution in an amount of 20% by weight relative to the poly(1-ethynyl-2-n-butylnaphthalene), and then stirred, thereby a light control material was obtained. The light control materials obtained above were each applied for coating on a glass substrate having a thickness of 0.1 mm by a spin coating method (800 rpm×10 minutes), and dried at 30° C. for 1 hour to form coating films so that light control films were obtained.

The light transmitting properties of the obtained light control films are as shown in FIG. 4.

Example 4

(1) Preparation of poly(1-(2-naphthyl)-2-(4-pentylphenyl)acetylene)

To 250 mL of triethylamine were added 3.4 g of 4-pentylphenylacetylene, 0.61 g of dichlorobis(triphenylphosphine)palladium, 0.63 g of triphenylphosfine, 0.62 g of copper iodide, and 4.55 g of 2-bromonaphthalene, and reacted at 90° C. for 3 hours. After removing the solvent by an evaporator, ethyl ether was added to the resulting solution to extract the generated compound. The ethyl ether layer was washed with 300 mL of distilled water for 3 times, dried over anhydrous magnesium sulfate for 24 hours, followed by filtration, and the solvents in the filtrate solution were removed by evaporation. The resulting product was purified on a column using hexane as a developing solvent, thereby 3.2 g of 1-(2-naphthyl)-2-(4-pentylphenyl)acetylene was obtained. The obtained 1-(2-naphthyl)-2-(4-pentylphenyl)acetylene was analyzed by $^1$H-NMR (270 MHz, $CDCl_3$), and the NMR spectra showed peak at δ 8.0 (1H), 7.8 (3H), 7.6 (1H), 7.5 (4H), 7.2 (2H) 2.6 (2H), 1.6 (2H), 1.3 (4H), 0.9 (3H).

The obtained 1-(2-naphthyl)-2-(4-pentylphenyl)acetylene (0.46 g) was polymerized with a $TaCl_5$-$nBu_4Sn$ catalyst so that 0.25 g of poly(1-(2-naphthyl)-2-(4-pentylphenyl)acetylene) was obtained.

(2) Production of Light Control Material and Light Control Film

The obtained poly(1-(2-naphthyl)-2-(4-pentylphenyl) acetylene) was dissolved in toluene to prepare a toluene solution containing 0.8% by weight of the poly(1-(2-naphthyl)-2-(4-pentylphenyl)acetylene) as a light control material. The light control material obtained above was applied for coating on a glass substrate having a thickness of 0.1 mm by a spin coating method (800 rpm×10 minutes), and dried at 30° C. for 1 hour to form a coating film. The substrate on which the coating film was formed was exposed to nitric acid vapor for 10 minutes under normal temperature and normal pressure and, and then dried so that a light control film was obtained.

Further, the poly(1-(2-naphthyl)-2-(4-pentylphenyl)acetylene) was dissolved in toluene to prepare a toluene solution containing 0.8% by weight of the poly(1-(2-naphthyl)-2-(4-pentylphenyl)acetylene), and gold (III) chloride was added to the toluene solution in an amount of 20% by weight relative to the poly(1-(2-naphthyl)-2-(4-pentylphenyl)acetylene), and then stirred so that a light control material was provided. The light control material obtained above was applied for coating on a glass substrate having a thickness of 0.1 mm by a spin coating method (800 rpm×10 minutes), and dried at 30° C. for 1 hour to form a coating film, thereby a light control film was obtained.

The light transmitting properties of the obtained light control films are as shown in FIG. 5.

Example 5

The poly(1-ethynyl-2-methylnaphthalene) obtained in Example 1 was dissolved in toluene to prepare a toluene solution containing 1.0% by weight of the poly(1-ethynyl-2-methylnaphthalene) as a light control material.

The obtained light control material was applied for coating on a glass electrode substrate having a thickness of 0.7 mm (surface resistance 100Ω) on which ITO was coated, by a spin coating method (800 rpm×10 seconds), and dried at 30° C. for 5 minutes to form a coating film, thereby a light control film was obtained.

On the other hand, 1.0 g of lithium perchlorate was dissolved in 66 mL of propylene carbonate, and to the solution was added 3.3 g of polyethylene glycol (molecular weight of 300,000) so that an electrolyte was prepared.

A layer of the electrolyte with a thickness of 100 μm was laminated on the glass substrate on which the coating film had been formed, and further, the glass electrode substrate on which ITO had been coated was laminated thereon, thereby a light control body was produced.

Next, direct current voltages of 0, 1.2, 1.5, and 2.0 were applied to the obtained light control body, and the transmittance was observed by a spectrophotometer (UV-3101PC, manufactured by Shimadzu Corporation). The light transmitting property of the light control body when each of the voltages was applied was shown in FIG. 6.

According to FIG. 6, it is found that each of the light control bodies exerts light control functions in a wide wavelength range when a voltage is applied. It is also found that, by adjusting the application voltage, the wavelength range of transmitted light or the transmittance can be controlled.

Example 6

The 1-(2-naphthyl)-2-(4-pentylphenyl)acetylene obtained in Example 4 was dissolved in toluene to prepare a toluene solution containing 0.75% by weight of the 1-(2-naphthyl)-2-(4-pentylphenyl)acetylene as a light control material.

The obtained light control material was applied for coating on a glass electrode substrate having a thickness of 0.7 mm (surface resistance 100Ω) on which ITO was coated, by a spin coating method (800 rpm×10 seconds), and dried at 30° C. for 5 minutes to form a coating film, thereby a light control film was obtained.

On the other hand, 1.0 g of lithium perchlorate was dissolved in 66 mL of propylene carbonate, and to the solution was added 3.3 g of polyethylene glycol (molecular weight of 300,000) so that an electrolyte was prepared.

A layer of the electrolyte with a thickness of 100 μm was laminated on the glass substrate on which the coating film had been formed, and further, the glass electrode substrate on which ITO had been coated was laminated thereon, thereby a light control body was produced.

Next, direct current voltages of 0, 1.7, 2.2, and 2.5 were applied to the obtained light control body, and the transmittance was observed by a spectrophotometer (UV-3101PC, manufactured by Shimadzu Corporation). The light transmitting property of the light control body when each of the voltages was applied was shown in FIG. 7.

According to FIG. 7, it is found that each of the light control bodies exerts light control functions in a wide wavelength range when a voltage is applied. It is also found that, by adjusting the application voltage, the wavelength range of transmitted light or the transmittance can be controlled.

Example 7

A light control body was manufactured in the same manner as in Example 5, except that the poly(1-ethynyl-2-n-hexylnaphthalene)acetylene obtained in Example 2 was used.

Example 8

To 25 mL of a tetrahydrofuran solution of 3.05 g of ethynylnaphthalene was added 27.5 mL of a 1.6 mol/L hexane solution of n-butyl lithium at −50° C. under a nitrogen atmosphere, and the mixture was cooled to −80° C., and then 15 mL of a tetrahydrofuran solution of 2.25 g of potassium tert-butoxide was added thereto. After stirring at −80° C. for 1 hour, the temperature was raised up to 5° C. At −70° C., 4.42 g of bromodecane was dropped to the resulting solution, and stirred at 20° C. for 2 hours. After addition of 150 mL of diethyl ether at 0° C., 50 mL of water was dropped to the resulting solution to extract the generated compound. The diethyl ether layer was washed with 50 mL of distilled water for 3 times, dried over anhydrous magnesium sulfate for 1 hour, followed by filtration, and the solvent was removed by evaporation. The resulting product was purified on a column using hexane as a developing solvent, thereby 2.1 g of 1-ethynyl-2-n-decylnaphthalene was obtained. The obtained 1-ethynyl-2-n-decylnaphthalene was analyzed by $^1$H-NMR (270 MHz, CDCl$_3$), and the NMR spectra showed peak at δ 8.3 (1H), 7.8 (2H), 7.5 (3H), 3.6 (1H), 3.0 (2H) 1.7 (2H), 1.3 (16H), 0.9 (3H).

The obtained 1-ethynyl-2-n-decylnaphthalene (1.0 g) was polymerized with a WCl$_6$ catalyst so that 0.6 g of poly(1-ethynyl-2-n-decylnaphthalene) was obtained. The obtained poly(1-ethynyl-2-n-decylnaphthalene) (0.5 g) was dissolved in toluene to prepare a toluene solution containing 1.0% by weight of the poly(1-ethynyl-2-n-decylnaphthalene) as a light control material. A light control body was produced in the same manner as in Example 5, except that the thus obtained light control material was used.

Next, direct current voltages of 0, 1.2, 1.5, and 2.0 were applied to the obtained light control body, and the transmittance was observed by a spectrophotometer (UV-3101PC, manufactured by Shimadzu Corporation). The light transmitting property of the light control body when each of the voltages was applied was shown in FIG. 8.

According to FIG. 8, it is found that each of the light control bodies exerts light control functions in a wide wavelength range when a voltage is applied. It is also found that, by adjusting the application voltage, the wavelength range of transmitted light or the transmittance can be controlled.

Example 9

To 20 mL of a tetrahydrofuran solution of 2.88 g of ethynylnaphthalene was added 25 mL of a 1.6 mol/L hexane solution of n-butyl lithium at −50° C. under a nitrogen atmosphere, and the mixture was cooled to −90° C., and then 12 mL of a tetrahydrofuran solution of 2.3 g of potassium tert-butoxide was added thereto. After stirring at −80° C. for 1 hour, the temperature was raised up to 5° C. At −70° C., 6.90 g of bromooctadecane was dropped to the resulting solution, and stirred overnight at 30° C. 100 mL of water was dropped to the resulting solution at 0° C., and hexane was added thereto to extract the generated compound. The hexane layer was washed with 30 mL of distilled water for 3 times, dried over anhydrous magnesium sulfate for 24 hours, followed by filtration, and the solvent was removed by evaporation. The resulting product was purified on a column by using hexane as a developing solvent, thereby 1.5 g of 1-ethynyl-2-n-octadecylnaphthalene was obtained. The obtained 1-ethynyl-2-n-decylnaphthalene was analyzed by $^1$H-NMR (270 MHz, CDCl$_3$), and the NMR spectra showed peak at δ 8.3 (1H), 7.8 (2H), 7.5 (3H), 3.6 (1H), 3.0 (2H) 1.7 (2H), 1.3 (32H), 0.9 (3H).

The obtained 1-ethynyl-2-n-octadecylnaphthalene (1.0 g) was polymerized with a WCl$_6$ catalyst so that 0.5 g of poly (1-ethynyl-2-n-octadecylnaphthalene) was obtained. The obtained poly(1-ethynyl-2-n-octadecylnaphthalene) (0.5 g) was dissolved in toluene to prepare a toluene solution containing 1.0% by weight of the poly(1-ethynyl-2-n-octadecylnaphthalene) as a light control material. A light control body was produced in the same manner as in Example 5, except that the thus obtained light control material was used.

Next, direct current voltages of 0, 1.2, 1.5, and 2.0 were applied to the obtained light control body, and the transmittance was observed by a spectrophotometer (UV-3101PC, manufactured by Shimadzu Corporation). The light transmitting property of the light control body when each of the voltages was applied was shown in FIG. 9.

According to FIG. 9, it is found that each of the light control bodies exerts light control functions in a wide wavelength range when a voltage is applied. It is also found that, by adjusting the application voltage, the wavelength range of transmitted light or the transmittance can be controlled.

(Evaluation)

Each of the light control bodies obtained in Examples 5 to 9 was evaluated for response and repetition durability according to the following methods.

The results are as shown in Table 1.

(1) Response

Color change in response to the change in voltage was visually observed, and the evaluation was performed based on the following criteria.

○: Good response, Rapid color change

Δ: Not good response, Certain time is required before development of color change ×: Bad response, Long time is required before development of color change (2) Repetition Durability Application and non-application of a 2.5V voltage were repeated to test the durability, and the evaluation was performed based on the following criteria.

⊚: Light control performance does not change at more than 10,000 times of repetition ○: Light control performance does not change with about 5000 times of repetition, but significantly deteriorates after about 9,000 times of repetition Δ: Light control performance does not change with about 500 times of repetition, but significantly deteriorates after about 1,000 times of repetition ×: Light control performance significantly deteriorates after about 500 times of repetition

TABLE 1

|  | Example 5 | Example 6 | Example 7 | Example 8 | Example 9 |
|---|---|---|---|---|---|
| Respnse | ○ | ○ | ○ | ○ | ○ |
| Repetition durability | ○ | ○ | ⊚ | ⊚ | ⊚ |

Example 10

The poly(1-ethynyl-2-n-octadecylnaphthalene) prepared in Example 9 was dissolved in chloroform to prepare a chloroform solution containing 0.8% by weight of the poly(1-ethynyl-2-n-octadecylnaphthalene) as a light control material.

The light control material obtained above was applied for coating on a glass substrate having a thickness of 0.7 mm by a spin coating method (800 rpm×10 minutes), and dried at 30° C. for 5 minutes to form coating films, thereby light control films were obtained.

The light control films obtained above were heated on a hot plate for 5 minutes at respective temperatures of 150° C. and 200° C. By using the heat-treated light control films, light control bodies were produced in the same manner as in Example 9. Transmittance of the light control bodies was observed by a spectrophotometer (UV-3101PC, manufactured by Shimadzu Corporation) before and after the heat treatment to obtain the light transmitting properties. The light transmitting properties are as shown in FIG. 10.

FIG. 10 shows that the light control films can control the absorption wavelength in the visible light range by a heat treatment.

A 2.0V direct current voltage was applied to the light control bodies heat treated as mentioned above, and the transmittance was observed by a spectrophotometer (UV-3101PC, manufactured by Shimadzu Corporation). The light transmitting properties of the light control bodies when voltage is applied thereto are as shown in FIG. 11.

FIGS. 10 and 11 show that the light control bodies can control the absorption wavelength in the visible light range without deteriorating the absorption properties in near-infrared range when they are heat treated.

INDUSTRIAL APPLICABILITY

The present invention can provide a light control material capable of optionally controlling the light transmittance of an arbitrary wavelength range among a wide wavelength range, and a light control film formed by using the light control material.

BRIEF DESCRIPTION OF THE DRAWINGS

FIG. 1 is the transmittance spectrum showing light transmitting properties of the light control film produced in Example 1.

FIG. 2 is the transmittance spectrum showing light transmitting properties of the light control film produced in Example 1.

FIG. 3 is the transmittance spectrum showing light transmitting properties of the light control film produced in Example 2.

FIG. 4 is the transmittance spectrum showing light transmitting properties of the light control film produced in Example 3.

FIG. 5 is the transmittance spectrum showing light transmitting properties of the light control film produced in Example 4.

FIG. 6 is the transmittance spectrum showing the light transmitting properties of the light control films produced in Example 5 obtained when a direct current voltage is applied thereto.

FIG. 7 is the transmittance spectrum showing the light transmitting properties of the light control bodies produced in Example 6 obtained when a direct current voltage is applied thereto.

FIG. 8 is the transmittance spectrum showing the light transmitting properties of the light control bodies produced in Example 8 obtained when a direct current voltage is applied thereto.

FIG. 9 is the transmittance spectrum showing the light transmitting properties of the light control bodies produced in Example 9 obtained when a direct current voltage is applied thereto.

FIG. 10 is the transmittance spectrum showing the light transmitting properties of the light control bodies produced in Example 10 obtained when a heat treatment is carried out thereon.

FIG. 11 is the transmittance spectrum showing the light transmitting properties of the light control bodies produced in Example 10 obtained when a direct current voltage is applied thereto.

The invention claimed is:

1. A light control material,
which contains a stimulus sensitive resin and is capable of controlling the light transmittance in a specific wavelength range, said stimulus sensitive resin being a polyacetylene compound having a repeating unit represented by the following general formula (1):

[Chemical Formula 1]

(1)

in the formula (1), $R^1$ represents a naphthalene group, a phenanthrene group, a pyrenyl group or an anthracene group, each of the four groups being substituted by a group selected from the group consisting of: an alkyl group having 1 to 40 carbon atoms, an alkoxy group (with an alkyl group having 1 to 40 carbon atoms), an $SR^4$ group ($R^4$ represents a hydrogen atom or an alkyl group having 1 to 40 carbon atoms), an $NR^5R^6$ group ($R^5$ and $R^6$ may be the same or different, and each represents a hydrogen atom or a group selected from alkyl groups having 1 to 40 carbon atoms), a cyano group, a carboxy group, a sulfoxyl group, an ester group, an amide group and $COR^7$ ($R^7$ represents an alkyl group having 1 to 40 carbon atoms), or the following general formula (2):

[Chemical Formula 2]

(2)

in the formula (2), $R^2$ represents a naphthalene group or an anthracene group; $R^3$ represents a phenyl group substituted by a substituent X at the position m or the position p; and the substituent X represents a group selected from the group consisting of: an alkyl group having 1 to 20 carbon atoms, an alkoxy group (with an alkyl group having 1 to 20 carbon atoms), an $SR^4$ group ($R^4$ represents a hydrogen atom or an alkyl group having 1 to 20 carbon atoms), an $NR^5R^6$ group ($R^5$ and $R^6$ may be the same or different, and each represents a hydrogen atom or a group selected from alkyl groups having 1 to 20 carbon atoms), a cyano group, a carboxy group, a sulfoxyl group, an ester group, an amide group and $COR^7$ ($R^7$ represents an alkyl group having 1 to 20 carbon atoms).

2. The light control material according to claim 1, which contains an oxidizing agent and/or a reducing agent.

3. A light control film, which comprises the light control material according to claim 2.

4. A light control body,
which has the light control film according to claim 3, and a means for providing an external stimulus.

5. A light control body,
which has the light control film according to claim 3, and a means for providing an external stimulus,
wherein a laminated body of the light control film according to claim 6 and an electrolyte layer is sandwiched between a pair of electrode substrates, and
the external stimulus is an electric stimulus.

6. A light control film,
which comprises the light control material according to claim 1.

7. A light control body,
which has the light control film according to claim 6, and a means for providing an external stimulus.

8. A light control body,
which has the light control film according to claim 6, and a means for providing an external stimulus,
wherein a laminated body of the light control film according to claim 3 and an electrolyte layer is sandwiched between a pair of electrode substrates, and
the external stimulus is an electric stimulus.

* * * * *